United States Patent
Han et al.

(10) Patent No.: US 10,556,224 B2
(45) Date of Patent: Feb. 11, 2020

(54) COMPOSITE COMPOSITION FOR HARMFUL GAS REMOVAL CONTAINING COPPER-MANGANESE CATALYST

(71) Applicant: SEILFA CO., LTD., Seoul (KR)

(72) Inventors: Yang Su Han, Siheung-si (KR); Ji Ho Lee, Ansan-si (KR); Sae Hee Kim, Seoul (KR); Hee Suk Lee, Seoul (KR)

(73) Assignee: SEILFA CO., LTD., Seoul (KR)

( * ) Notice: Subject to any disclaimer, the term of this patent is extended or adjusted under 35 U.S.C. 154(b) by 0 days.

(21) Appl. No.: 15/776,529

(22) PCT Filed: Mar. 17, 2016

(86) PCT No.: PCT/KR2016/002702
§ 371 (c)(1),
(2) Date: May 16, 2018

(87) PCT Pub. No.: WO2017/090836
PCT Pub. Date: Jun. 1, 2017

(65) Prior Publication Data
US 2018/0345254 A1    Dec. 6, 2018

(30) Foreign Application Priority Data

Nov. 24, 2015 (KR) .................. 10-2015-0164557

(51) Int. Cl.
*B01J 23/72* (2006.01)
*B01J 35/10* (2006.01)
(Continued)

(52) U.S. Cl.
CPC .............. *B01J 23/72* (2013.01); *B01D 53/86* (2013.01); *B01D 53/864* (2013.01); *B01J 21/16* (2013.01);
(Continued)

(58) Field of Classification Search
CPC ........ B01D 53/86; B01D 53/864; B01J 23/72; B01J 23/34; B01J 23/8892; B01J 21/16;
(Continued)

(56) References Cited

U.S. PATENT DOCUMENTS 5,283,041 A    2/1994 Nguyen et al.
5,851,943 A    12/1998 Barris et al.
(Continued)

FOREIGN PATENT DOCUMENTS

JP    2000-140577 A    5/2000
JP    2003119089 A * 4/2003 ........... Y02A 40/201
(Continued)

OTHER PUBLICATIONS

Marban et al (High Surface Area CuMn2O4 Prepared by Silica-Aquagel Confined co-precipitation. Characterization and Testing in Steam Reforming of Methanol (SRM), Catal Lett, (2007) 118:8-14) (Year: 2007).*

*Primary Examiner* — Melvin C. Mayes
*Assistant Examiner* — Michael Forrest
(74) *Attorney, Agent, or Firm* — Rabin & Berdo, P.C.

(57) ABSTRACT

This invention relates to a composite composition for harmful gas removal containing a copper-manganese catalyst, which is capable of removing ambient and indoor pollutants, such as carbon monoxide and volatile organic compounds, the composite composition including a copper-manganese composite catalyst hybridized with an inorganic layer compound, an inorganic filler, activated carbon, and a binder.

4 Claims, 3 Drawing Sheets

(51) Int. Cl.
  *B01D 53/86* (2006.01)
  *B01J 23/34* (2006.01)
  *B01J 37/00* (2006.01)
  *B01J 37/04* (2006.01)
  *B01J 37/08* (2006.01)
  *B01J 21/16* (2006.01)
  *B01J 23/889* (2006.01)
  *B01J 35/00* (2006.01)
  *B01J 37/02* (2006.01)
  *B01J 21/18* (2006.01)

(52) U.S. Cl.
  CPC ............... *B01J 21/18* (2013.01); *B01J 23/34* (2013.01); *B01J 23/8892* (2013.01); *B01J 35/0026* (2013.01); *B01J 35/10* (2013.01); *B01J 35/1019* (2013.01); *B01J 35/1023* (2013.01); *B01J 35/1038* (2013.01); *B01J 35/1042* (2013.01); *B01J 37/0063* (2013.01); *B01J 37/0203* (2013.01); *B01J 37/04* (2013.01); *B01J 37/084* (2013.01); *B01J 37/088* (2013.01); *B01D 2257/502* (2013.01); *B01D 2257/708* (2013.01); *B01J 2523/17* (2013.01); *B01J 2523/72* (2013.01)

(58) Field of Classification Search
  CPC ........ B01J 21/18; B01J 35/10; B01J 35/1019; B01J 35/1023; B01J 35/1038; B01J 35/1042; B01J 37/0063; B01J 37/0203; B01J 37/04; B01J 37/084; B01J 37/088
  See application file for complete search history.

(56) References Cited

U.S. PATENT DOCUMENTS

| | | |
|---|---|---|
| 6,458,741 B1 | 10/2002 | Roark et al. |
| 2012/0189489 A1 | 7/2012 | Kwon et al. |
| 2016/0060782 A1 | 3/2016 | Kim et al. |

FOREIGN PATENT DOCUMENTS

| | | | | |
|---|---|---|---|---|
| JP | 2015-134318 A | | 7/2015 | |
| KR | 10-2002-0028791 A | | 4/2002 | |
| KR | 10-2012-0085079 A | | 7/2012 | |
| KR | 10-2012-0096171 A | | 8/2012 | |
| KR | 10-2014-0119331 A | | 10/2014 | |
| KR | 102016035224 A | * | 3/2016 | ............. B01J 23/72 |
| RU | 2054322 C1 | * | 2/1996 | ............. B01J 23/84 |

* cited by examiner

COMPOSITE COMPOSITION FOR HARMFUL GAS REMOVAL CONTAINING COPPER-MANGANESE CATALYST

TECHNICAL FIELD

The present invention relates to a composite composition for harmful gas removal containing a copper-manganese catalyst, and more particularly to a composite composition for harmful gas removal containing a copper-manganese catalyst, which is capable of removing ambient and indoor pollutants, such as carbon monoxide and volatile organic compounds.

BACKGROUND ART

Long-term exposure to harmful gases such as carbon monoxide in a closed space causes fatal damage to human bodies.

There is thus a need for a catalyst capable of efficiently removing such harmful gases even at ambient temperatures. Hopcalite, which is a mixture of manganese oxide, copper oxide and the like, useful as a catalyst used for removing carbon monoxide at room temperature, is relatively economical and is highly effective at removing carbon monoxide, but the effect thereof is known to be drastically lowered in the presence of water.

Also, a catalyst composed of nano-sized (5 nm) gold (Au) particles supported on metal oxide has high ability to oxidize carbon monoxide at room temperature. However, the preparation and dispersion of uniform nano-sized metal particles require high technology, which is undesirable. A noble metal catalyst such as Au, Pd, or Pt exhibits superior catalytic efficiency, improved performance, durability, and resistance to poisoning, but is limited in distribution thereof due to the high price thereof. Furthermore, the carbon monoxide removal efficiency is high at high temperatures but is decreased at low temperatures, and the removal efficiency cannot be maintained for a long period of time.

U.S. Pat. No. 5,283,041 discloses the treatment of organic halides using a ternary compound comprising vanadium oxide, zirconium oxide, and manganese, cerium or cobalt oxide, and Korean Patent Application Publication No. 2002-0028791 discloses the treatment of volatile organic compounds with mixed oxides of copper, manganese and rare earth metals such as La.

In the aforementioned techniques, the noble metal-based catalyst is advantageous because high activity is manifested at relatively low temperatures, but the material metal is expensive and the price thereof is volatile due to the scarcity of the corresponding metal and the increase in the demand thereof.

U.S. Pat. No. 6,458,741 discloses a catalyst composition for volatile organic compound decomposition, which essentially contains cerium and zirconium and includes a metal such as Gd, La, Sc, Cr, Ti, V, Mn, Pd or Pt, and U.S. Pat. No. 5,851,943 discloses a catalyst in which cobalt, chromium, copper, cerium or iron oxide is supported on aluminum or silica and a noble metal thin film of palladium, platinum, ruthenium or rhodium is further applied thereon.

In the aforementioned techniques, a noble metal and a non-noble metal are used together in order to solve the problems when a noble metal or a non-noble metal is used alone, but the noble metal component contained in the catalyst composition is poisoned by exhaust gas, which drastically deteriorates the catalytic activity. Hence, the above techniques cannot be utilized.

With the goal of realizing wide use in industrial fields and a variety of application fields, there is required a catalyst, which has high carbon monoxide removal efficiency at room temperature and may effectively remove odorous gases and volatile organic compounds at room temperature, in lieu of expensive noble metal catalysts.

PATENT DOCUMENTS

U.S. Pat. No. 5,283,041 (Registration Date: Feb. 1, 1994, Title: Catalytic incineration of organic compounds)

Korean Patent Application Publication No. 2002-0028791 (Laid-open date: Apr. 17, 2002, Title: Catalyst for oxidation)

U.S. Pat. No. 6,458,741 (Registration Date: Oct. 1, 2002, Title: Catalysts for low-temperature destruction of volatile organic compounds in air)

U.S. Pat. No. 5,851,943 (Registration Date: Dec. 22, 1998, Title: Ceramic production process)

DISCLOSURE

Technical Problem

Accordingly, the present invention has been made keeping in mind the problems encountered in the related art, and the present invention is intended to provide a composite composition for harmful gas removal containing copper-manganese oxide, which may exhibit high removal efficiency of carbon monoxide, nitrogen oxide (NOx), ozone, odorous gases and volatile organic compounds at a low temperature (room temperature), compared to conventional expensive noble metal catalysts.

In addition, the present invention is intended to provide a composite composition for harmful gas removal containing copper-manganese oxide, having high specific surface area and pore volume.

Technical Solution

Therefore, the present invention provides a composite composition for harmful gas removal containing a copper-manganese catalyst, comprising a copper-manganese composite catalyst hybridized with an inorganic layer compound, an inorganic filler, activated carbon and a binder.

The composite composition for harmful gas removal preferably includes 0.5~90 wt % of a copper-manganese composite catalyst hybridized with an inorganic layer compound, 5~99 wt % of an inorganic filler, 0.1~50 wt % of activated carbon, and 0.02~10 wt % of a binder, and more preferably 1~20 wt % of a copper-manganese composite catalyst hybridized with an inorganic layer compound, 45~55 wt % of an inorganic filler, 30~40 wt % of activated carbon, and 4~8 wt % of a binder.

Specifically, the inorganic filler is a porous and lightweight inorganic material, and examples thereof may include inorganic minerals, such as porous silica, alumina, titania, pearlite, kaolin, and the like.

The binder is at least one selected from among an inorganic binder and an organic binder, and the organic binder is contained in an amount of 5 wt % or less based on the total amount of the binder.

The inorganic binder includes at least one selected from among colloidal silica, titania, zirconia, water glass, alumina sol, and an inorganic layer compound.

The organic binder includes at least one selected from the group consisting of methyl cellulose, hydroxyethyl cellulose, hydroxypropylmethyl cellulose, hydroxyethylmethyl cellulose, methylethyl cellulose, carboxymethyl cellulose, hydroxypropyl cellulose, polyvinyl alcohol, polyethylene glycol, polyacrylic acid, polymethyl methacrylate, and hydroxypropyl.

The copper-manganese composite catalyst hybridized with the inorganic layer compound has a particle size of 50 nm or less, in which a copper salt and a manganese salt are mixed at a molar ratio of 1:2~1:8. As the copper salt, at least one selected from among copper nitrate, copper chloride, copper iodide, copper bromide, cupric sulfate and copper acetate, may be mixed with the manganese salt, which is at least one selected from among manganese nitrate, manganese chloride, manganese iodide, manganese bromide, manganese sulfate, potassium permanganate and manganese acetate.

The inorganic layer compound is smectite-based natural or synthetic clay, and particularly, is at least one selected from among montmorillonite, bentonite, hectorite, saponite, beidellite, nontronite, Laponite, Smecton, leucitite, and swellable mica.

As the activated carbon, granular or powdered activated carbon may be used without particular limitation. Preferably useful is powdered activated carbon, and more preferably, powdered activated carbon having a particle size of about 500 mesh or less is used.

The composite composition preferably has a density of 0.3~1.0 g/cm$^3$, a specific surface area of 300~800 m$^2$/g, and a total pore volume (porosity) of 0.3~1.0 cm$^3$/g, and particularly, a density of 0.71~0.75 g/cm$^3$, a specific surface area of 550~600 m$^2$/g, and a porosity of 0.85~0.9 cm$^3$/g.

Advantageous Effects

As described above, the present invention is effective at removing carbon monoxide, nitrogen oxide (NOx), odorous gases and volatile organic compounds, which are harmful to human bodies, at room temperature.

Also, the present invention can realize low production costs and can exhibit high gas removal efficiency at room temperature, compared to conventional noble metal catalysts, and can thus be widely utilized for industrial fields and a variety of application fields.

Also, in the present invention, the density and porosity (pore volume) fall in appropriate ranges, and the specific surface area is maximized, thereby maximizing physical adsorption of harmful gases and odorous materials.

BEST MODE

Figure 1:
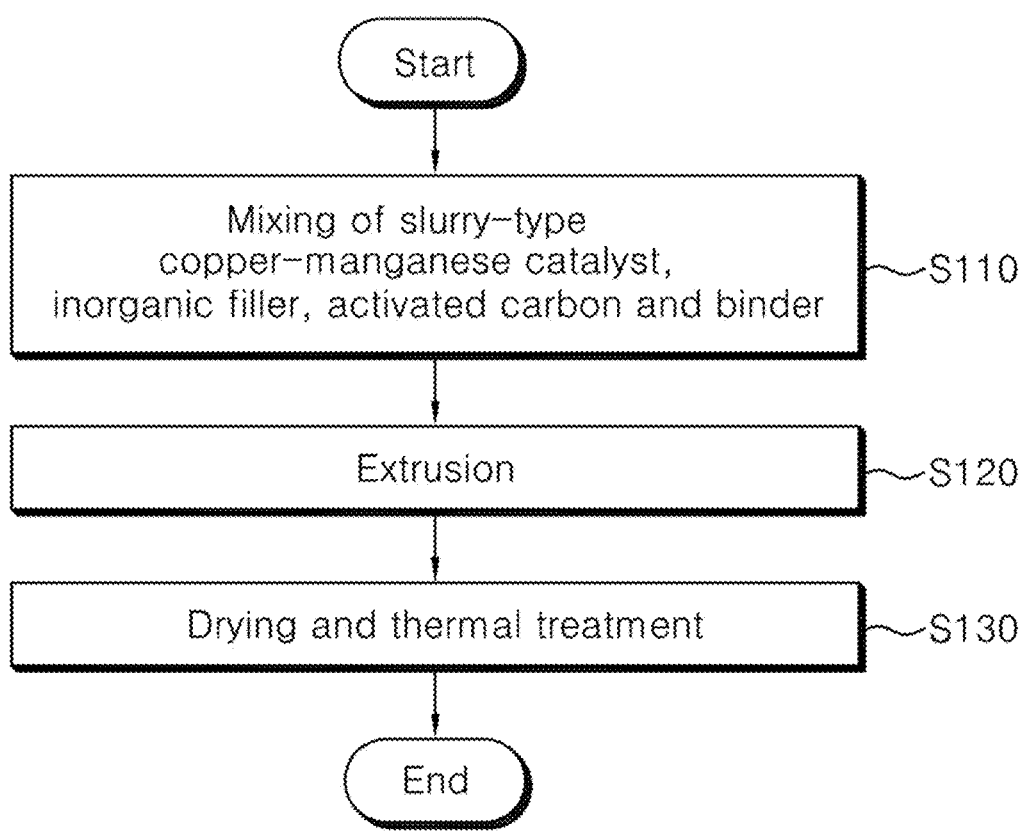
FIG. 1 shows the process of preparing a composite composition in pellet form for harmful gas removal containing a copper-manganese catalyst according to the present invention.

Hereinafter, a detailed description will be given of preferred embodiments of the present invention with reference to the accompanying drawings. Throughout the drawings, corresponding or like elements are denoted by the same reference numerals throughout the specification. It is also to be noted that a detailed description of the related art will be omitted when it would make the gist of the present invention unclear.

The present invention addresses a composite composition containing a copper-manganese catalyst, thus exhibiting high porosity to thereby manifest high harmful gas removal efficiency. The composite composition for harmful gas removal containing a copper-manganese catalyst according to the present invention includes a copper-manganese catalyst, an inorganic filler, activated carbon, and a binder, and preferably includes 0.5~90 wt % of a copper-manganese composite catalyst hybridized with an inorganic layer compound, 5~99 wt % of an inorganic filler, 0.1~50 wt % of activated carbon, and 0.02~10 wt % of a binder, and more preferably 1~20 wt % of a copper-manganese composite catalyst hybridized with an inorganic layer compound, 45~55 wt % of an inorganic filler, 30~40 wt % of activated carbon, and 4~8 wt % of a binder.

Here, the copper-manganese catalyst preferably includes a copper salt and a manganese salt mixed at a molar ratio of 1:2~1:8, with a particle size of 50 nm or less, and the copper salt may be at least one selected from among copper nitrate, copper chloride, copper iodide, copper bromide, cupric sulfate and copper acetate, and the manganese salt may be at least one selected from among manganese nitrate, manganese chloride, manganese iodide, manganese bromide, manganese sulfate, potassium permanganate and manganese acetate.

Below, the copper-manganese catalyst is referred to as a copper-manganese composite catalyst hybridized with an inorganic layer compound.

More preferably, the copper-manganese composite catalyst hybridized with the inorganic layer compound is prepared by mixing 100 parts by weight of an inorganic layer compound with 120~180 parts by weight of potassium permanganate, 300~400 parts by weight of manganese acetate, and 100~150 parts by weight of copper acetate in an aqueous solution phase.

Here, the inorganic layer compound is smectite-based natural or synthetic clay, and is at least one selected from among montmorillonite, bentonite, hectorite, saponite, beidellite, nontronite, Laponite, Smecton, leucitite, and swellable mica.

If the amount of the copper-manganese composite catalyst hybridized with the inorganic layer compound is less than 1 wt %, the density may decrease and carbon monoxide removal efficiency may decrease. On the other hand, if the amount thereof exceeds 20 wt %, carbon monoxide removal efficiency may become good but the specific surface area and porosity may decrease. Thus, the copper-manganese composite catalyst hybridized with the inorganic layer compound may be prepared in the manner described in Example 1.

The inorganic filler is a porous and lightweight inorganic material, and examples thereof may include inorganic minerals, such as porous silica, alumina, titania, pearlite, kaolin, and the like.

The activated carbon is a carbonaceous material that is capable of adsorbing a solute in a solution or a gas, and the activated carbon functions to increase porosity and specific surface area. If the amount of activated carbon in the composite composition exceeds 50 wt %, the porosity and specific surface area may increase, and thus good adhesion performance may result, but the gas removal efficiency may decrease.

As the activated carbon, granular or powdered activated carbon may be used without particular limitation. Here, powdered activated carbon is preferably used, and powdered activated carbon having a particle size of about 500 mesh or less is more preferably used.

The binder is at least one selected from among an inorganic binder and an organic binder, and upon the use of the organic binder, the organic binder is preferably contained in an amount of 5 wt % or less based on the total amount of the binder.

The inorganic binder includes at least one selected from among colloidal silica, titania, zirconia, water glass, alumina sol, and an inorganic layer compound, and the organic binder includes at least one selected from the group consisting of methyl cellulose, hydroxyethyl cellulose, hydroxypropylmethyl cellulose, hydroxyethylmethyl cellulose, methylethyl cellulose, carboxymethyl cellulose, hydroxypropyl cellulose, polyvinyl alcohol, polyethylene glycol, polyacrylic acid, polymethyl methacrylate, and hydroxypropyl.

The composite composition preferably has a density of 0.3~1.0 g/cm$^3$, a specific surface area of 300~800 m$^2$/g, and a total pore volume (porosity) of 0.3~1.0 cm$^3$/g.

The process of forming the composite composition for harmful gas removal containing the copper-manganese composite catalyst hybridized with the inorganic layer compound into pellets is shown in FIG. 1.

Specifically, a slurry-type copper-manganese composite catalyst hybridized with an inorganic layer compound, an inorganic filler, activated carbon, and a binder are mixed (S110). Here, the copper-manganese composite catalyst hybridized with the inorganic layer compound in Example 2 of the present invention is a copper-manganese oxide catalyst slurry having a water content of 80 wt %, but is not limited only to the slurry phase.

Figure 2:
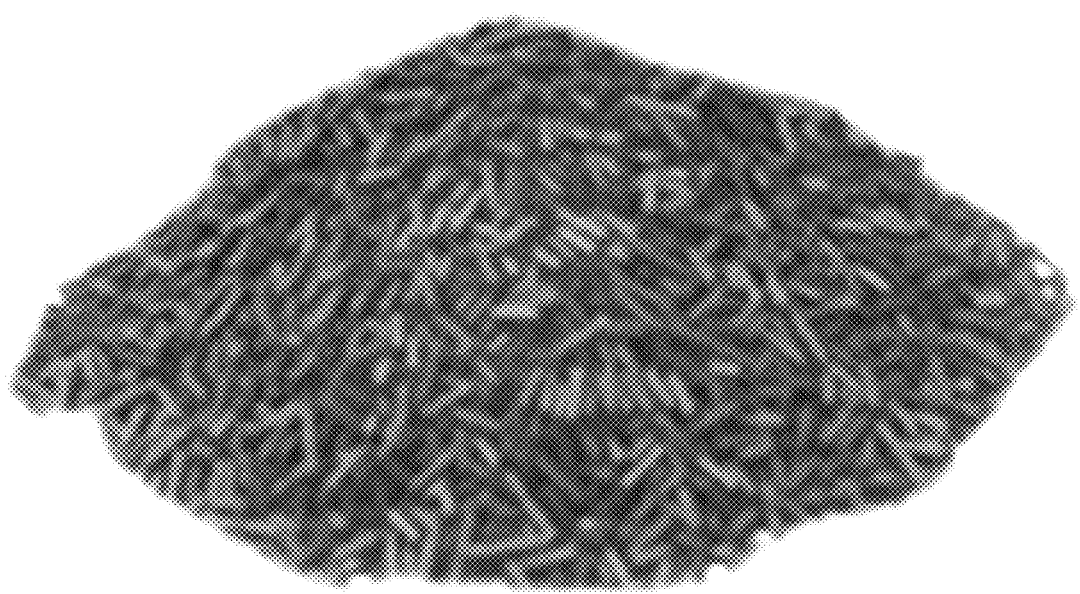
FIG. 2 is an image showing the composite composition in pellet form for harmful gas removal containing a copper-manganese catalyst according to the present invention.

Subsequently, the resulting mixture is placed in a mold and extruded (S120), and the extruded product is dried and thermally treated (S130). Thereby, the composite composition for harmful gas removal containing the copper-manganese catalyst may be provided in the form of pellets. The composite composition in pellet form is shown in FIG. 2.

The preparation of the composite composition in pellet form is described again in Example 2.

EXAMPLE 1

Preparation of Copper-manganese Composite Catalyst Hybridized with Inorganic Layer Compound An inorganic layer compound and distilled water were placed in a reactor and stirred, thus preparing 2 kg of a 2 wt % inorganic layer compound aqueous solution.

The aqueous solution was added with 0.4 mol (63.21 g) of potassium permanganate (KMnO$_4$), stirred at room temperature for 1 hr, further added with an aqueous solution obtained by dissolving 0.6 mol (147.1 g) of manganese acetate (Mn(CH$_3$COO)$_2$.4H$_2$O) in 2.2 mol (40 ml) of distilled water, stirred at room temperature for 1 hr, further added with an aqueous solution obtained by dissolving 0.25 mol (50 g) of copper acetate (Cu(CH$_3$COO)$_2$.H$_2$O) in 46.6 mol (839 ml) of distilled water, and stirred at room temperature for 2 hr.

After the stirring, the reaction product was washed with distilled water to remove unreacted materials and impurities, finally obtaining a copper-manganese composite catalyst slurry hybridized with an inorganic layer compound having a water content of 80 wt %. That is, the solid content of the copper-manganese composite catalyst hybridized with the inorganic layer compound was 20 wt %.

EXAMPLE 2

Preparation of Composite Composition in Pellet Form 750 g of the copper-manganese composite catalyst slurry hybridized with the inorganic layer compound of Example 1, 500 g of silica powder, 350 g of activated carbon, 200 ml of a 2 wt % inorganic layer compound aqueous solution, 100 ml of a 1 wt % methyl cellulose aqueous solution and 100 ml of 50 wt % colloidal silica were mixed to give a mixture, which was then stirred using a mixer and extruded into 3 mm pellets using a pelletizing machine.

The pellets thus formed were dried at 120° C. for 6 hr and then thermally treated at 300° C. for 4 hr, finally obtaining a composite composition in pellet form.

The composite composition produced in pellet form in this way is disposed together with a ventilation filter at a ventilation opening through which harmful materials are released, whereby the harmful materials can be purified and then discharged.

EXAMPLES 3 to 5

Preparation of Composite Composition in Pellet Form

The composite compositions in pellet form of Examples 3 to 5 were prepared in the same manner as in Example 2, with the exception that the amounts of the components thereof were changed.

TABLE 1

|  | Example 2 | Example 3 | Example 4 | <unit g> Example 5 |
|---|---|---|---|---|
| Composite catalyst (20 wt %) | 750 | 1250 | 50 | 750 |
| Fumed silica | 500 | 500 | 500 | 500 |
| Activated carbon | 350 | 350 | 500 | 500 |
| Organic binder (1 wt %) | 100 | 100 | 100 | 100 |
| Colloidal silica (50 wt %) | 100 | 100 | 100 | 100 |
| Inorganic layer compound (2 wt %) | 200 | 200 | 200 | 200 |

COMPARATIVE EXAMPLE 1

Preparation of Catalyst not in Pellet Form

The copper-manganese composite catalyst slurry hybridized with the inorganic layer compound of Example 1 was dried at 120° C. for 2 hr and then made into a powdery copper-manganese catalyst composite, which was then thermally treated at 280° C. for 2 hr, thus obtaining a copper-manganese catalyst composite.

The composite compositions prepared as above were evaluated for porosity and gas removal performance.

1. Evaluation of Porosity

The porosity-related properties of the copper-manganese composite catalysts, prepared by thermal treatment of the copper-manganese composite catalyst precursor hybridized with the inorganic layer compound having a layered structure, were evaluated through nitrogen adsorption-desorption isothermic analysis The nitrogen adsorption-desorption isothermic analysis was performed at a temperature at which nitrogen is in a liquid phase (77K), and all samples were pretreated at 200° C. in a vacuum for 2 hr before measurement.

The results of nitrogen adsorption-desorption isothermic analysis thus measured and the densities are shown in Table 2 below.

TABLE 2

|  | Example 2 | Example 3 | Example 4 | Example 5 | Comparative Example 1 |
|---|---|---|---|---|---|
| Density (g/cm$^3$) | 0.73 | 0.98 | 0.30 | 0.85 | 1.12 |
| Specific surface area (m$^2$/g) | 561 | 350 | 800 | 750 | 336 |
| Porosity (cm$^3$/g) | 0.89 | 0.51 | 0.93 | 0.91 | 0.25 |

As is apparent from Table 2, Examples 2 to 5 and Comparative Example 1, in which the amounts of the components of the pellets are varied, were different in density and porosity.

The composite catalyst compositions in pellet form of Examples 2 to 5 were decreased in density and remarkably improved in porosity-related properties compared to Comparative Example 1.

Specifically, the amount of the copper-manganese composite catalyst hybridized with the inorganic layer compound was larger in Example 3 than in Example 2, and the density was higher in Example 3 than in Example 2, but the specific surface area and porosity thereof were decreased. Also, the amount of the copper-manganese composite catalyst hybridized with the inorganic layer compound was smaller and the amount of activated carbon was larger in Example 4 than in Example 2, and thus high specific surface area and porosity but low density resulted, compared to Example 2.

The amount of activated carbon was larger in Example 5 than in Example 2, and when the amount of activated carbon was increased in this way, the density, specific surface area and porosity were high compared to Example 2.

The density can be confirmed to be affected by the amount of the copper-manganese composite catalyst hybridized with the inorganic layer compound and the amount of activated carbon. Specifically, in order to increase the above effects, when the amount of the copper-manganese composite catalyst hybridized with the inorganic layer compound is increased, the other effects are decreased, and thus the amount of the copper-manganese composite catalyst hybridized with the inorganic layer compound has to be used within an appropriate range.

In Examples 2 to 5 according to the present invention, the composite composition had appropriate density, specific surface area, and porosity, falling in the ranges of a density of 0.3~1.0 g/cm$^3$, a specific surface area of 300~800 m$^2$/g, and a total pore volume (porosity) of 0.3~1.0 cm$^3$/g, but in Comparative Example 1, the density and porosity fell outside of the appropriate ranges. The specific surface area of Examples 2 to 5 according to the present invention can be found to be maximized compared to Comparative Example 1.

2. Evaluation of Gas Removal Performance

Upon the evaluation of gas removal performance, the removal efficiencies of carbon monoxide (CO), ammonia (NH$_3$), hydrogen sulfide (H$_2$S), acetaldehyde (CH$_3$CHO), and toluene (C$_6$H$_5$CH$_3$) were measured at room temperature using the composite composition in pellet form of Example 2.

The gas removal performance of each of Examples 2 to 5 and Comparative Example 1 was evaluated as follows.

Evaluation of Carbon Monoxide Removal Efficiency

To evaluate carbon monoxide removal efficiency, 50 g of a copper-manganese-containing pellet-type catalyst sample was placed in a 5 L Tedlar bag and carbon monoxide having a concentration of 50 ppm was injected thereto, after which changes in concentration over time were measured using a composite gas detector (Q-RAE Plus). The results of measurement of carbon monoxide removal efficiency are shown in Table 3 below.

After 30 min, carbon monoxide was removed in an amount of 90% or more in Example 2, and was removed in amounts of 94%, 70%, and 84% in Examples 3, 4 and 5, respectively, but was removed in an amount of 30% in Comparative Example 1. In particular, after 60 min, removal performance was not significantly improved in Comparative Example 1 compared to Examples.

Evaluation of Ammonia Removal Efficiency

To evaluate ammonia removal efficiency, 50 g of a copper-manganese-containing pellet-type catalyst sample was placed in a 5 L Tedlar bag and ammonia having a concentration of 50 ppm was injected thereto, after which changes in concentration over time were measured using a Gastec detector tube. The results of measurement of ammonia removal efficiency are shown in Table 3 below.

After 30 min, ammonia was removed in an amount of 92% or more in Example 2, and was removed in amounts of 60%, 86%, and 70% in Examples 3, 4 and 5, respectively, but the removal efficiency was not great in Comparative Example 1, and was not improved over time.

Evaluation of Hydrogen Sulfide Removal Efficiency

To evaluate hydrogen sulfide removal efficiency, 50 g of a copper-manganese-containing pellet-type catalyst sample was placed in a 5 L Tedlar bag and hydrogen sulfide having a concentration of 50 ppm was injected thereto, after which changes in concentration over time were measured using a Gastec detector tube. The results of measurement of hydrogen sulfide removal efficiency are shown in Table 3 below.

After 30 min, hydrogen sulfide was removed in an amount of 100% in Example 2, and was removed in amounts of 90%, 80%, and 86% in Examples 3, 4 and 5, respectively, but the removal efficiency was not great in Comparative Example 1.

Evaluation of Acetaldehyde Removal Efficiency

To evaluate acetaldehyde removal efficiency, 50 g of a copper-manganese-containing pellet-type catalyst sample was placed in a 5 L Tedlar bag and acetaldehyde having a concentration of 50 ppm was injected thereto, after which changes in concentration over time were measured using a Gastec detector tube. The results of measurement of acetaldehyde removal efficiency are shown in Table 3 below.

After 30 min, acetaldehyde was removed in an amount of 80% or more in Example 2, and was removed in amounts of 50%, 50%, and 70% in Examples 3, 4 and 5, respectively, but the removal efficiency was not great in Comparative Example 1.

Evaluation of Toluene Removal Efficiency

To evaluate toluene removal efficiency, 50 g of a copper-manganese-containing pellet-type catalyst sample was placed in a 5 L Tedlar bag and toluene having a concentration of 50 ppm was injected thereto, after which changes in concentration over time were measured using a Gastec detector tube. The results of measurement of toluene removal efficiency are shown in Table 3 below.

After 30 min, toluene was removed in an amount of 66% or more in Example 2, and was removed in amounts of 50%, 40%, and 76% in Examples 3, 4 and 5, respectively, but the removal efficiency was not great in Comparative Example 1.

TABLE 3

<unit ppm>

|  | Time | Example 2 | Example 3 | Example 4 | Example 5 | Comparative Example 1 |
|---|---|---|---|---|---|---|
| CO removal | 30 min | 5 | 3 | 15 | 8 | 35 |
|  | 60 min | 1 | 0.5 | 7 | 2 | 27 |
| $NH_3$ removal | 30 min | 4 | 20 | 7 | 15 | 40 |
|  | 60 min | 0 | 7 | 0 | 5 | 35 |
| $H_2S$ removal | 30 min | 0 | 5 | 10 | 7 | 43 |
|  | 60 min | 0 | 0 | 2 | 0 | 39 |
| $CH_3CHO$ removal | 30 min | 10 | 25 | 25 | 15 | 45 |
|  | 60 min | 1 | 8 | 5 | 2 | 40 |
| Toluene removal | 30 min | 17 | 25 | 30 | 15 | 46 |
|  | 60 min | 2 | 8 | 10 | 0 | 42 |

Figure 3:
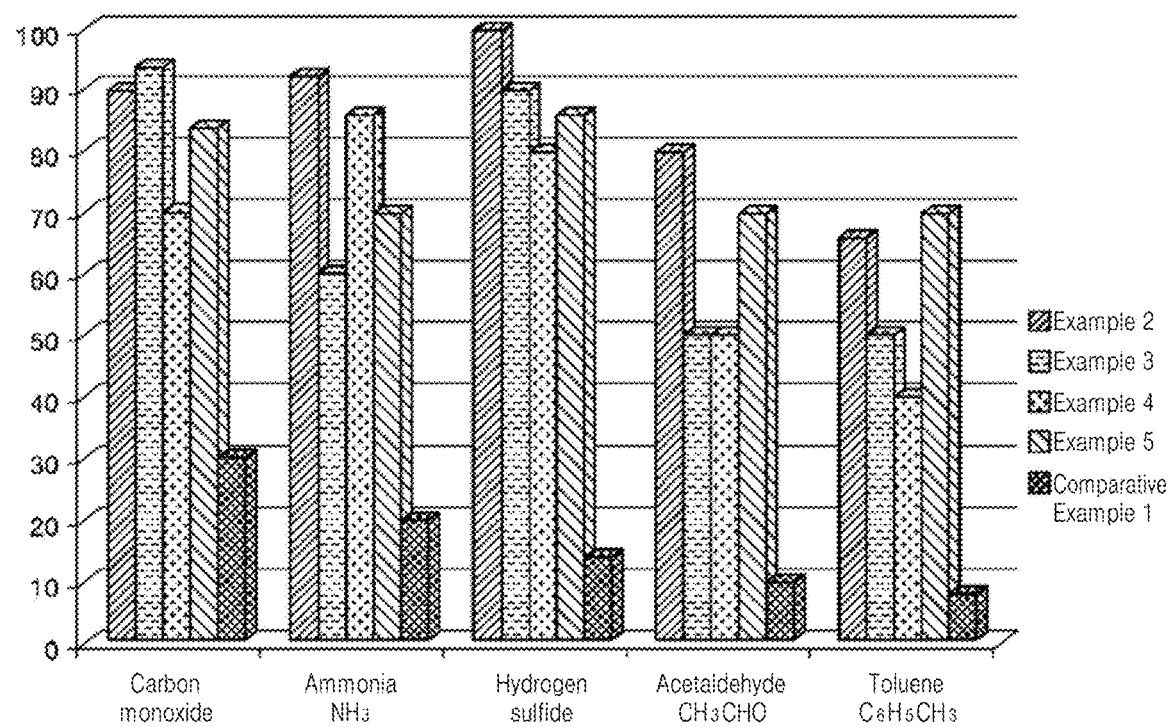
FIG. 3 is a graph showing the results of gas removal efficiency of Examples 2 to 5 according to the present invention and Comparative Example 1.

Table 3 shows the gas removal efficiency results, and the gas removal efficiency results after 30 min in Table 3 are graphed in FIG. 3.

As is apparent from FIG. 3 and Table 3, the composite catalyst compositions having superior porosity-related properties of Examples 2 to 5 were remarkably improved in gas removal efficiency compared to Comparative Example 1.

More specifically, the amount of the copper-manganese composite catalyst hybridized with the inorganic layer compound was larger in Example 3 than in Example 2, and thus the carbon monoxide removal efficiency was high but the removal efficiency of ammonia, hydrogen sulfide, acetaldehyde and toluene was very low.

Also, the amount of the copper-manganese composite catalyst hybridized with the inorganic layer compound was smaller in Example 4 than in Example 2, and thus the removal efficiency of ammonia, hydrogen sulfide, acetaldehyde, and toluene, as well as carbon monoxide, was very low.

Also, the amount of activated carbon was larger in Example 5 than in Example 2, and thus the removal efficiency of compounds other than toluene, namely carbon monoxide, ammonia, hydrogen sulfide, and acetaldehyde, was low.

Accordingly, the present invention can be found to be very effective at removing various gases.

Therefore, the present invention is capable of effectively removing carbon monoxide, odorous gases and volatile organic compounds, which are harmful to human bodies, at room temperature.

Also, the present invention can realize low production costs and can exhibit superior gas removal efficiency at room temperature, compared to conventional noble metal catalysts, and can thus be widely utilized in industrial fields and various application fields.

Moreover, in the present invention, the density and porosity (pore volume) fall in appropriate ranges, and the specific surface area is maximized, thereby maximizing physical adsorption of harmful gases and odorous materials.

The composite composition for harmful gas removal containing the copper-manganese catalyst as mentioned above is not limited to the configuration and the manner of operation of the embodiments described above. The above embodiments may be configured so that all or some of the embodiments may be selectively combined to make various modifications.

What is claimed is:

1. A composition for harmful gas removal, comprising:
   0.5 to 90 wt % of a composite of copper-manganese oxides with an inorganic layer compound being smectite clay selected from the group consisting of montmorillonite, bentonite, hectorite, saponite, beidellite, nontronite, Laponite, Smecton, leucitite, and swellable mica,
   wherein the composite is obtained by mixing 100 parts by weight of the inorganic layer compound with 120 to 180 parts by weight of potassium permanganate, 300 to 400 parts by weight of manganese acetate, and 100 to 150 parts by weight of copper acetate;
   5 to 99 wt % of a porous inorganic filler;
   0.1 to 50 wt % of activated carbon; and
   0.02 to 10 wt % of a binder,
   wherein the binder is at least one of an inorganic binder and an organic binder,
   wherein the inorganic binder is at least one selected from the group consisting of colloidal silica, titania, zirconia, water glass and alumina sol,
   wherein the organic binder is at least one selected from the group consisting of methyl cellulose, hydroxyethyl cellulose, hydroxypropylmethyl cellulose, hydroxyethylmethyl cellulose, methylethyl cellulose, carboxymethyl cellulose, hydroxypropyl cellulose, polyvinyl alcohol, polyethylene glycol, polyacrylic acid and polymethyl methacrylate.

2. The composition of claim 1, wherein the porous inorganic filler is at least one selected from the group consisting of porous silica, alumina, titania, pearlite, and kaolin.

3. The composition of claim 1, wherein the organic binder is contained in an amount of 5 wt % or less based on a total amount of the binder.

4. The composition of claim 1, wherein the composition has a density of 0.3 - 1.0 $g/cm^3$, a specific surface area of 300-800 $m^2/g$, and a total pore volume (porosity) of 0.3-1.0 $cm^3/g$ determined by nitrogen adsorption-desorption isothermic analysis.

* * * * *